(12) United States Patent
Ishihara et al.

(10) Patent No.: US 8,967,025 B2
(45) Date of Patent: Mar. 3, 2015

(54) SCRAP COLLECTOR FOR OPTICAL FIBER CUTTER

(71) Applicants: Masashi Ishihara, Sakura (JP); Manabu Tabata, Sakura (JP); Makoto Iwamatsu, Sakura (JP); Yuya Kurosaka, Sakura (JP)

(72) Inventors: Masashi Ishihara, Sakura (JP); Manabu Tabata, Sakura (JP); Makoto Iwamatsu, Sakura (JP); Yuya Kurosaka, Sakura (JP)

(73) Assignee: Fujikura Ltd., Tokyo (JP)

( * ) Notice: Subject to any disclaimer, the term of this patent is extended or adjusted under 35 U.S.C. 154(b) by 72 days.

(21) Appl. No.: 13/705,793

(22) Filed: Dec. 5, 2012

(65) Prior Publication Data

US 2013/0098215 A1    Apr. 25, 2013

Related U.S. Application Data

(63) Continuation of application No. PCT/JP2011/072193, filed on Sep. 28, 2011.

(30) Foreign Application Priority Data

Sep. 28, 2010  (JP) .................................. 2010-217633

(51) Int. Cl.
  *B26D 7/06*   (2006.01)
  *B26D 7/00*   (2006.01)
  (Continued)

(52) U.S. Cl.
  CPC ................ *B26D 7/1836* (2013.01); *G02B 6/25* (2013.01)
  USPC .............................................. 83/156; 83/267

(58) Field of Classification Search
  CPC .................. G02B 2006/12166; G02B 6/4202; G02B 6/25
  USPC .......... 83/170, 156, 167, 267; 225/2, 96, 101, 225/93, 103, 96.5; 125/23 R; 226/8, 120, 226/125, 129, 145
  See application file for complete search history.

(56) References Cited

U.S. PATENT DOCUMENTS 4,480,516 A * 11/1984 Leroy ................................ 83/98
4,553,461 A * 11/1985 Belongia ......................... 83/344
4,768,050 A * 8/1988 Beery ............................ 396/583
(Continued)

FOREIGN PATENT DOCUMENTS

| CN | 2645095 Y | 9/2004 |
|---|---|---|
| JP | 10-96819 A | 4/1998 |
| JP | 2001-296430 A | 10/2001 |

OTHER PUBLICATIONS

Office Action issued by Chinese Patent Office in Chinese Patent Application No. 201180046983.7 mailed Sep. 11, 2014.

(Continued)

*Primary Examiner* — Ghassem Alie
*Assistant Examiner* — Bharat C Patel
(74) *Attorney, Agent, or Firm* — Sughrue Mion, PLLC

(57) ABSTRACT

An optical fiber feeding mechanism of a scrap collector includes a lower roller and an upper roller for advancing an optical fiber scrap cut out by an optical fiber cutter into a scrap receptacle, and further includes a roller holding member. In a state in which the lower roller and the upper roller are not actuated, the roller holding member forms a clearance enough to keep the lower roller and the upper roller from holding an optical fiber therebetween. After the optical fiber cutter cuts the optical fiber, the roller holding member lowers the upper roller toward the lower roller in accordance with the rotation of the upper roller so that the optical fiber may be held by and between the lower roller and the upper roller.

7 Claims, 9 Drawing Sheets

(51) Int. Cl.
*B26D 7/18* (2006.01)
*G02B 6/25* (2006.01)

(56) References Cited

U.S. PATENT DOCUMENTS

| | | | |
|---|---|---|---|
| 5,174,182 A * | 12/1992 | Rosenthal et al. | 83/63 |
| 5,188,268 A * | 2/1993 | Hakoun et al. | 225/96.5 |
| 5,906,569 A * | 5/1999 | Ratzel | 493/363 |
| 6,577,804 B2 * | 6/2003 | Murakami et al. | 385/147 |
| 6,598,774 B2 * | 7/2003 | Kazama et al. | 225/100 |
| 6,628,886 B2 * | 9/2003 | Sommer et al. | 385/147 |
| 7,229,042 B2 * | 6/2007 | Thebault et al. | 242/388.1 |
| 7,305,169 B2 * | 12/2007 | Honma | 385/136 |
| 2002/0031323 A1 * | 3/2002 | Hattori et al. | 385/137 |
| 2002/0064355 A1 * | 5/2002 | Ware et al. | 385/95 |
| 2003/0000257 A1 * | 1/2003 | Chang et al. | 65/425 |
| 2008/0257112 A1 * | 10/2008 | Stepan et al. | 81/9.51 |

OTHER PUBLICATIONS

European Search Report in EP Application No. 11829188.6 mailed Feb. 11, 2014.

* cited by examiner

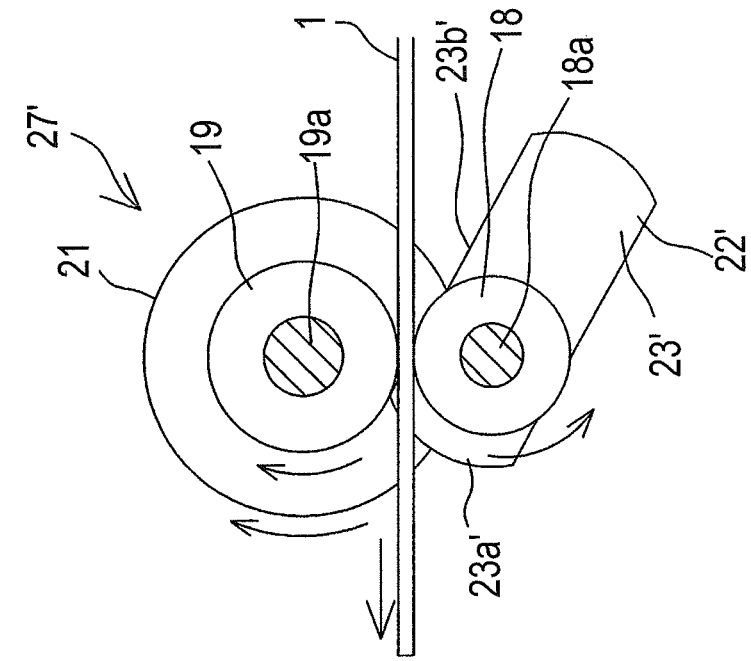
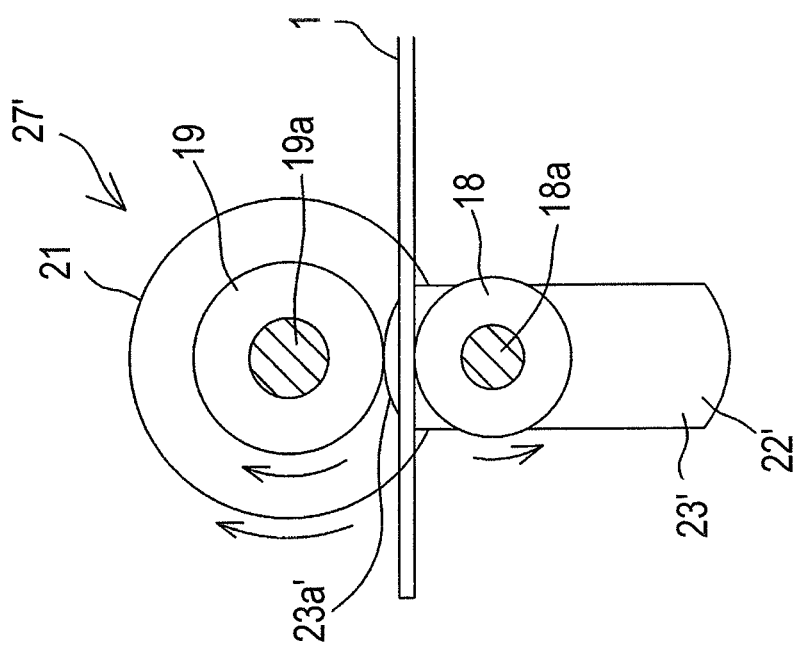

SCRAP COLLECTOR FOR OPTICAL FIBER CUTTER

CROSS-REFERENCE

This application is a Continuation of PCT Application No. PCT/JP2011/072193, filed on Sep. 28, 2011, and claims the priority of Japanese Patent Application No. 2010-217633, filed on Sep. 28, 2010, the content of both of which is incorporated herein by reference.

BACKGROUND OF THE INVENTION

1. Field of the Invention

The present invention relates to a scrap collector for an optical fiber cutter for collecting an optical fiber scrap generated when an optical fiber is cut.

2. Description of the Related Art

In the fusion splicing or the like of optical fibers, when an optical fiber is cut using an optical fiber cutter, the cut out portion of the optical fiber is discarded as a scrap. This scrap is originally an optical fiber, and therefore transparent and very thin. Accordingly, it is inefficient to pick up this scrap with a hand to discard it. For this reason, some optical fiber cutters are provided with scrap collectors attachable thereto and detachable therefrom.

FIGS. 1A to 1C are views schematically showing a conventional scrap collector 10 and an optical fiber cutter 11 having the scrap collector 10 attached thereto. FIG. 1A is a view showing a phase in which a lower roller 18 and an upper roller 19 of the scrap collector 10 hold an optical fiber 1 therebetween. FIG. 1B is a view showing a phase in which the optical fiber 1 is gripped by clamps 3 and 4 and cut after the phase of FIG. 1A. FIG. 1C is a view showing a phase in which the scrap collector 10 collects an optical fiber scrap 1a after the cutting.

The optical fiber cutter 11 includes an optical fiber holding portion (optical fiber holder) 2 for gripping a coated optical fiber 1A, the clamps 3 and 4 for gripping a stripped optical fiber (also called a bare fiber or a bare optical fiber) 1 on both sides of a position to be cut, a cutting blade 5 disposed between the two clamps 3 and 4, below the optical fiber 1, and an optical fiber pushing member 6 disposed above the cutting blade 5. The optical fiber pushing member 6 pushes down the optical fiber 1 toward the cutting blade 5 to impose tension on the optical fiber 1 as well as pressing the optical fiber 1 against the cutting blade 5. As a result, the optical fiber 1 is cut.

The clamp 3 includes a lower clamp 3A and an upper clamp 3B for gripping the optical fiber 1. The lower clamp 3A is fixed in place, and the upper clamp 3B is raised away from and lowered toward the lower clamp 3A. Similarly, the clamp 4 includes a lower clamp 4A and an upper clamp 4B for gripping the optical fiber 1A. The lower clamp 4A is fixed in place, and the upper clamp 4B is raised away from and lowered toward the lower clamp 4A.

The scrap collector 10 includes a scrap receptacle 15 and an optical fiber feeding mechanism 17 provided on the optical fiber cutter 11 side of the scrap receptacle 15. The scrap receptacle 15 includes a scrap receptacle main body 13 and a lid 14 attached to the scrap receptacle main body 13 with a hinge 16 in an openable and closable manner. The feeding mechanism 17 includes the lower roller 18 attached to the scrap receptacle main body 13 and the upper roller 19 attached to the lid 14.

In the conventional optical fiber cutter 11, as shown in FIG. 1A, the closing of the lid 14 of the scrap receptacle 15 causes the lower roller 18 and the upper roller 19 to hold the optical fiber 1 therebetween. After that, as shown in FIG. 1B, the clamps 3 and 4 grip the optical fiber 1.

Further, the optical fiber pushing member 6 moves down at the same time as the upper clamps 3B and 4B. Specifically, the clamps 3 and 4 grip the optical fiber 1, and then the optical fiber pushing member 6 pushes down the optical fiber 1 after a slight delay. This operation imposes tension on the optical fiber 1 as well as pressing the optical fiber 1 against the cutting blade 5. As a result, the optical fiber 1 is cut.

After the cutting of the optical fiber 1, as shown in FIG. 1C, the upper clamps 3B and 4B and the optical fiber pushing member 6 move up. Then, the lower roller 18 and the upper roller 19 rotate, and the optical fiber scrap 1a cut out of the optical fiber 1 is collected into the scrap receptacle 15.

SUMMARY OF THE INVENTION

In the above-described operation, when the closing of the lid 14 of the scrap collector 10 causes the lower roller 18 and the upper roller 19 to hold the optical fiber therebetween, the lower roller 18 and the upper roller 19 may move unequally in the axial direction while holding the optical fiber 1 therebetween due to a cause such as a shock produced by the closing of the lid 14. In this case, the lower roller 18 and the upper roller 19 turn a portion of the optical fiber 1 which is held by and between the rollers 18 and 19 (see FIG. 2A). As a result, the optical fiber 1 may be twisted.

Moreover, as shown in FIG. 3, when the lower roller 18 and the upper roller 19 rotate in reverse while holding the optical fiber 1 therebetween, the optical fiber 1 may be bent.

When an optical fiber in a twisted or bent state is cut while being gripped by the clamps 3 and 4 of the optical fiber cutter, the cut angle may be improper. In other words, the cut end face may not be perpendicular to the axis of the optical fiber.

The scrap collector described in Japan Patent Application Laid-Open Publication No. 10-96819 includes an anti-reverse mechanism for preventing the lower roller from being reversed using a ratchet mechanism (see FIG. 9, and paragraphs [0025] and [0026]). This anti-reverse mechanism prevents looseness (slack) in an optical fiber. However, the ratchet mechanism needs to include a pulley, a gear, a stopper (leaf spring), and the like, and has a complex structure and also cannot prevent the twisting of an optical fiber.

The present invention has been made in view of the above-described problems, and an object of the present invention is to provide a scrap collector in which the occurrence of twisting or bending in an optical fiber can be prevented when the optical fiber is cut.

One aspect of the present invention is a scrap collector for an optical fiber cutter for collecting an optical fiber scrap cut out to be discarded. The scrap collector includes a scrap receptacle attached to a cutter main body and an optical fiber feeding mechanism provided in the scrap receptacle. The optical fiber feeding mechanism includes a lower roller for receiving a tip portion of an optical fiber, the tip portion being cut out to be discarded; an upper roller capable of being raised away from and lowered toward the lower roller, the upper roller causing the tip portion of the optical fiber to be held by and between the upper roller and the lower roller and advancing the tip portion into the scrap receptacle; and a roller holding mechanism for forming, in a state in which the upper roller and the lower roller are not actuated, a clearance enough to keep the upper roller and the lower roller from holding the optical fiber therebetween, and for lowering the upper roller in accordance with rotation of any one of the upper roller and the lower roller to cause the upper roller and the lower roller to hold the optical fiber therebetween.

The roller holding mechanism may include a roller holding member loosely fitted to a shaft of any one of the upper roller and the lower roller. The roller holding member may be formed in an approximately rectangular shape having two short sides and two long sides corresponding to two pairs of opposite sides. The roller holding member may include a circular arc surface with a center thereof at the shaft of the one roller, the circular arc surface being formed by at least one of the two short sides. The roller holding member may be configured to naturally hang down with a longitudinal direction thereof vertically oriented when no external force acts on the roller holding member. The circular arc surface of the roller holding member may be in contact with the other of the upper roller and the lower roller when the roller holding member naturally hangs down.

The formula $c-a>d>a-b$ may be satisfied, where a denotes the radius of the any one of the upper roller and the lower roller, b denotes half of a width of the roller holding member, c denotes the radius of the circular arc surface, and d denotes the diameter of the optical fiber.

A weight may be provided closer to one of two longitudinally opposite ends of the roller holding member to cause the roller holding member to naturally hang down when no external force acts thereon.

A position in the roller holding member at which the shaft of the one roller is loosely fitted thereto may be off-center toward one of two longitudinally opposite ends of the roller holding member, to cause the roller holding member to naturally hang down when no external force acts thereon.

The following configuration may also be employed: the scrap receptacle includes a scrap receptacle main body detachably attached to the cutter main body and a lid attached to the scrap receptacle main body with a hinge in an openable and closable manner, the lower roller is attached to the scrap receptacle main body, and the upper roller is attached to the lid.

According to the present invention, a scrap collector can be provided in which the occurrence of twisting or bending in an optical fiber can be prevented when the optical fiber is cut.

BRIEF DESCRIPTION OF THE DRAWINGS

FIG. 1A is a view showing a phase in which upper and lower rollers of the scrap collector hold an optical fiber therebetween. FIG. 1B is a view showing a phase in which the optical fiber is gripped by clamps and cut after the phase of FIG. 1A. FIG. 1C is a view showing a phase in which the scrap collector collects an optical fiber scrap after the cutting.

FIG. 4A is a view showing a phase before clamps of the optical fiber cutter grip an optical fiber. FIG. 4B is a view showing a phase in which the optical fiber is gripped by the clamps and cut after the phase of FIG. 4A. FIG. 4C is a view showing a phase in which the scrap collector collects an optical fiber scrap after the cutting.

FIG. 8A shows comparisons between the lower roller and the roller holding member in a natural downward hanging state (initial state shown in FIG. 7A), and FIG. 8B shows comparisons between the lower roller and the roller holding member in a horizontal state.

FIGS. 10A and 10B are views showing another embodiment of the roller holding member. FIG. 10A is a view corresponding to Part FIG. 7A (showing a phase before the clamps of the optical fiber cutter grip the optical fiber). FIG. 10B is a view corresponding to FIG. 7C (showing a phase in which the scrap collector collects an optical fiber scrap after the cutting of the optical fiber).

FIG. 11A is a view corresponding to of FIG. 7A (showing a phase before the clamps of the optical fiber cutter grip the optical fiber). FIG. 11B is a view corresponding to FIG. 7C (showing a phase in which the scrap collector collects an optical fiber scrap after the cutting of the optical fiber).

DESCRIPTION OF THE PREFERRED EMBODIMENTS

Hereinafter, a scrap collector for an optical fiber cutter according to one embodiment of the present invention will be described with reference to the drawings.

Figure 4A:
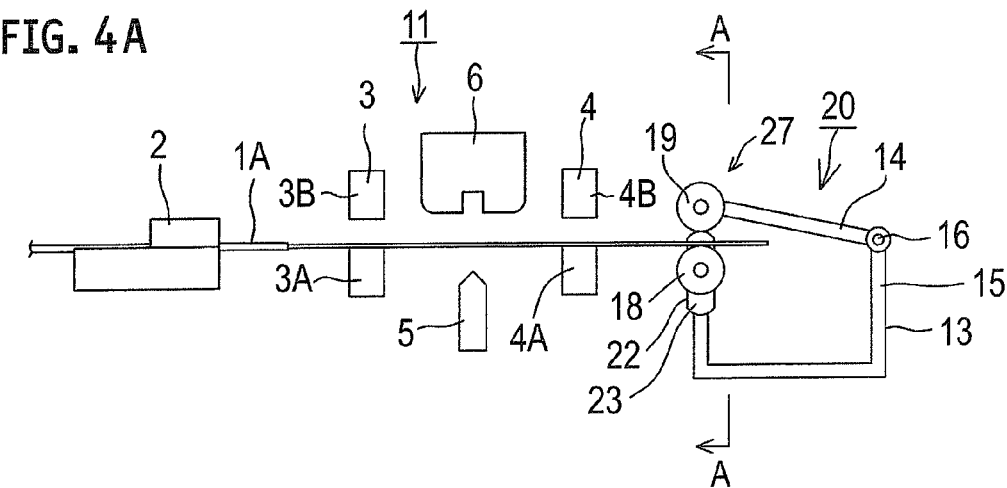
FIGS. 4A to 4C schematically show a scrap collector according to one embodiment of the present invention and an optical fiber cutter having the scrap collector attached thereto.
Figure 4B:
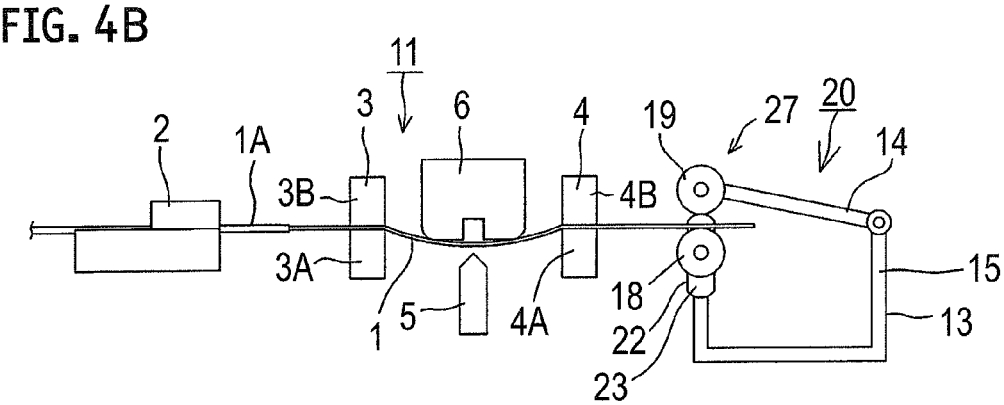
Figure 4C:
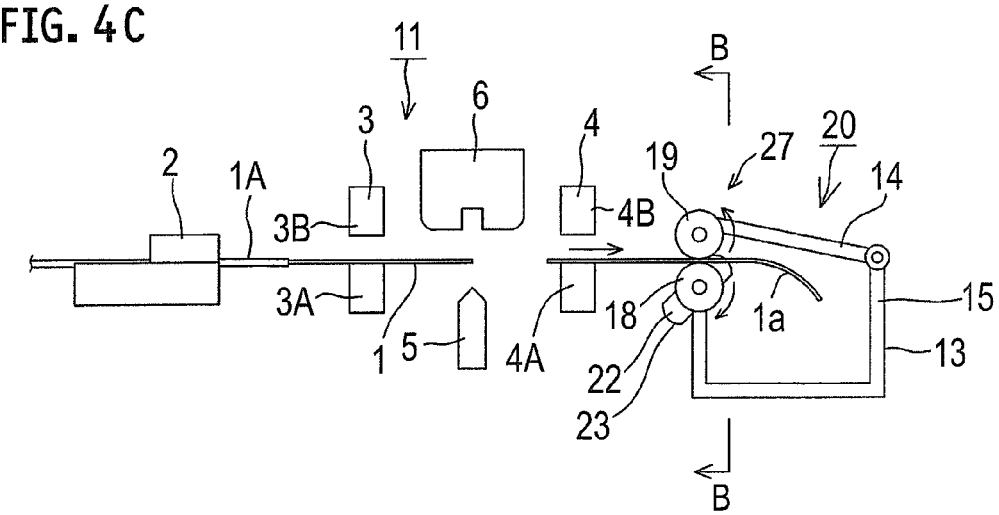
Figure 5:
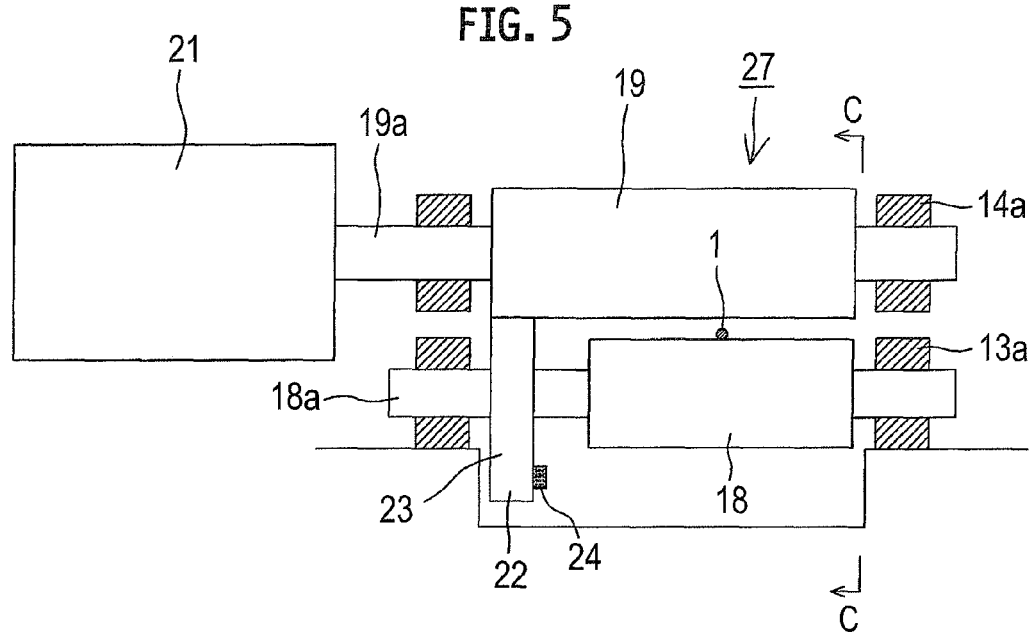
FIG. 5 is a view showing details of an optical fiber feeding mechanism of the scrap collector of FIG. 4A and corresponding to a cross section taken along line A-A of FIG. 4A.
Figure 6:
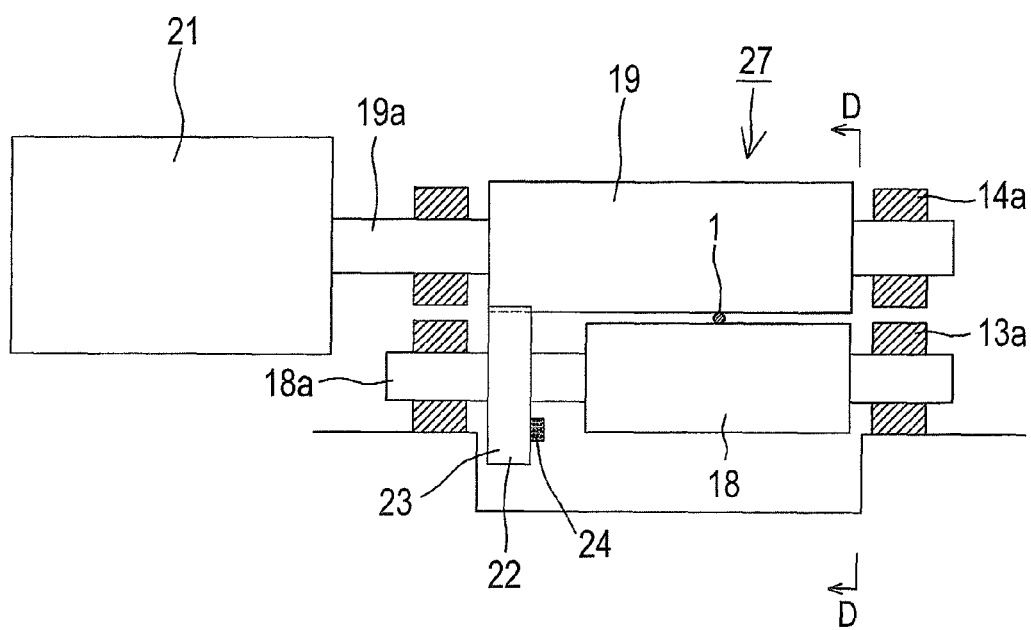
FIG. 6 is a view corresponding to a cross section taken along line B-B of FIG. 4C.

As shown in FIGS. 4 to 6, an optical fiber cutter 11 of this embodiment includes an optical fiber holding portion (optical fiber holder) 2 for gripping a coated optical fiber 1A, clamps 3 and 4 for gripping a stripped optical fiber (also called a bare fiber or a bare optical fiber) 1 on both sides of a position to be cut, a cutting blade 5 disposed between the two clamps 3 and 4, below the optical fiber 1, and an optical fiber pushing member 6 disposed above the cutting blade 5. The optical fiber pushing member 6 pushes down the optical fiber 1 toward the cutting blade 5. This pushing down by the optical fiber pushing member 6 imposes tension on the optical fiber 1 as well as pressing the optical fiber 1 against the cutting blade 5. As a result, the optical fiber 1 is cut.

The clamp 3 includes a lower clamp 3A and an upper clamp 3B for gripping the optical fiber 1. The lower clamp 3A is fixed to, for example, a cutter main body 31 (see FIG. 9). The upper clamp 3B is raised away from and lowered toward the lower clamp 3A. Similarly, the clamp 4 includes a lower clamp 4A and an upper clamp 4B for gripping the optical fiber 1. The lower clamp 4A is fixed to, for example, the cutter main body 31 (see FIG. 9). The upper clamp 4B is raised away from and lowered toward the lower clamp 4A.

Figure 9:
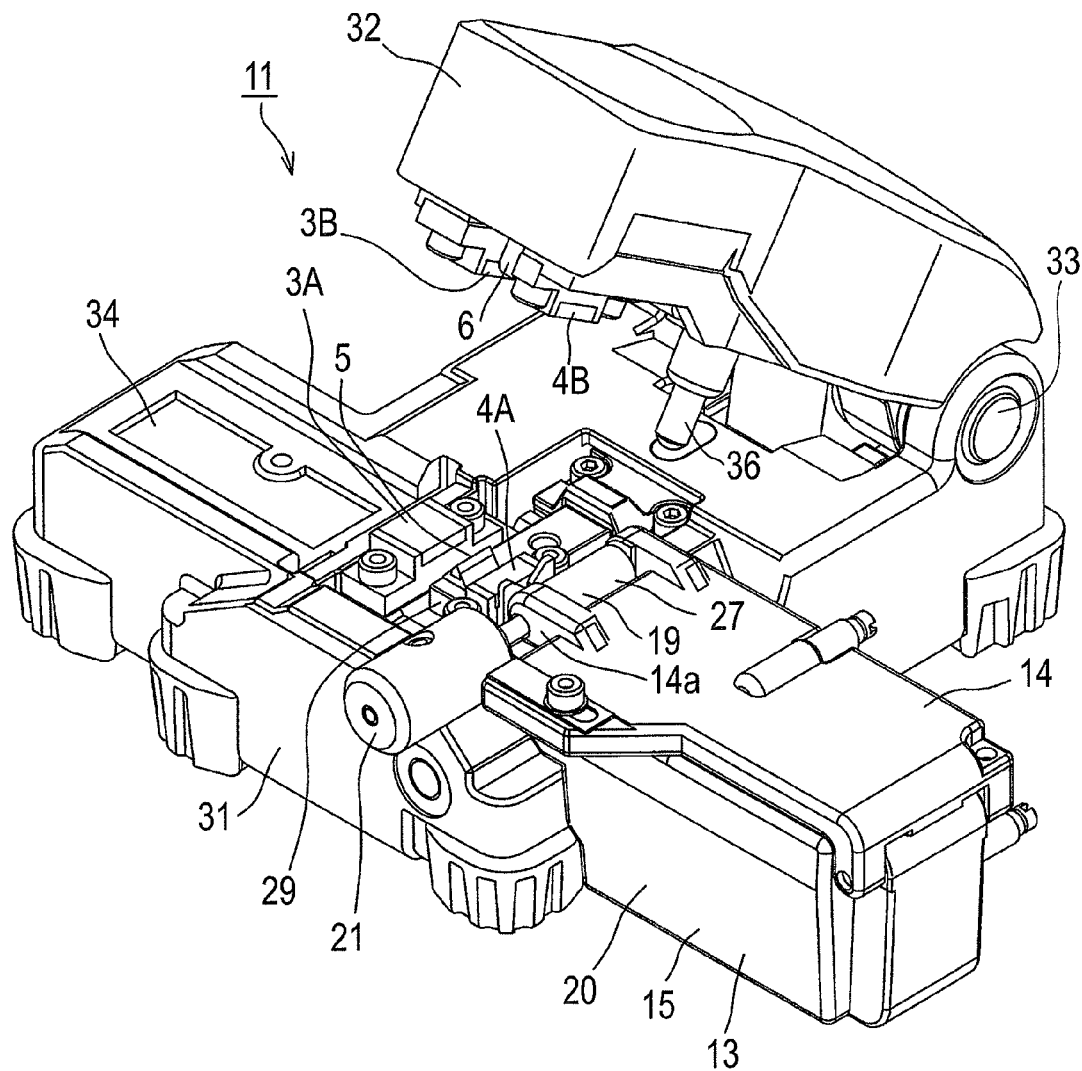
FIG. 9 is a perspective view showing the appearance of a specific example of the scrap collector according to one embodiment of the present invention and the optical fiber cutter having the scrap collector attached thereto.

As shown in FIG. 9, all of the upper clamps 3B and 4B and the optical fiber pushing member 6 are provided in a cutting lever 32 of the optical fiber cutter 11, and move down at the same time. It should be noted, however, that there is a slight delay between the gripping of the optical fiber 1 by the clamps 3 and 4 and the pushing down of the optical fiber by the optical fiber pushing member 6. It should be noted that the optical fiber cutter on which a scrap collector 20 described next is mounted is not limited to the above-described configuration. The optical fiber cutter may be an optical fiber cutter having a configuration in which, for example, a circular cutting blade is slid to score a lower surface of an optical fiber.

The scrap collector 20 of this embodiment includes a scrap receptacle 15 and an optical fiber feeding mechanism 27 provided on the optical fiber cutter 11 side of the scrap receptacle 15. The scrap receptacle 15 includes a scrap receptacle main body 13 and a lid 14 attached to the scrap receptacle main body 13 with a hinge 16 in an openable and closable manner.

The optical fiber feeding mechanism 27 includes a lower roller (first roller) 18 attached to the scrap receptacle main body 13 side, an upper roller (second roller) 19 attached to the lid 14 side, and a roller holding mechanism 22. To rotate the upper roller 19, a knob 21 (see FIGS. 5 and 9) is provided at an end portion of a shaft 19a of the upper roller 19. Reference numeral 13a denotes a lower roller's shaft receiving portion provided on the scrap receptacle main body 13 side. Reference numeral 14a denotes an upper roller's shaft receiving portion provided on the lid 14 side.

The roller holding mechanism 22 is configured to form, in a state in which the lower roller 18 and the upper roller 19 are not actuated (initial state of the operation of cutting the optical fiber which is shown in, for example, FIGS. 4A, 4B, 5 and 7A), a clearance h enough to keep the lower roller 18 and the upper roller 19 from holding the optical fiber 1 therebetween, and configured to lower the upper roller 19 in accordance with the rotation of the lower roller 18 to cause the lower roller 18 and the upper roller 19 to hold the optical fiber 1 therebetween. To enable such an operation, the roller holding mechanism 22 includes a roller holding member 23 supported by a shaft 18a of the lower roller 18. The roller holding member 23 is loosely fitted to the shaft 18a to such an extent that the roller holding member 23 can rotate with very little friction.

Figure 7A:
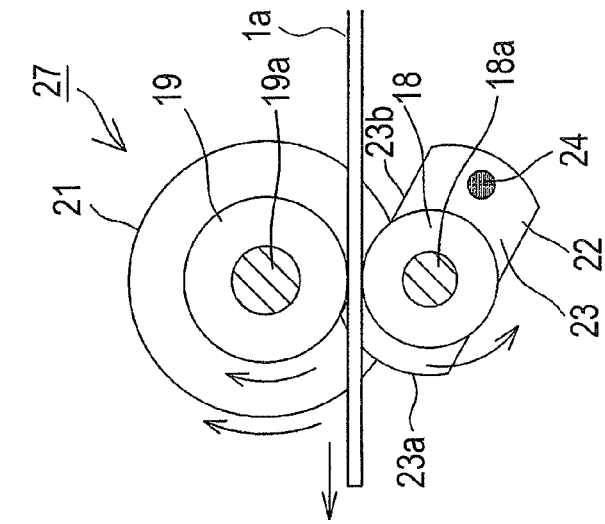
FIG. 7A is a cross-sectional view (showing a phase before the clamps of the optical fiber cutter grip the optical fiber) taken along line C-C of FIG. 5.

The roller holding member 23 is a member in the form of a flat plate formed in an approximately rectangular shape having two short sides and two long sides corresponding to two pairs of opposite sides. Of the two short sides, at least one short side forms a circular arc surface 23a with a center thereof at the lower roller's shaft 18a. Moreover, the roller holding member 23 has such a structure that when no external force acts thereon, the roller holding member 23 comes to naturally hang down with the longitudinal direction thereof (i.e., direction parallel to long sides thereof) vertically oriented (see FIGS. 4A, 4B and 7A; for convenience of explanation, this state is referred to as a natural downward hanging state). Moreover, in this natural downward hanging state, the circular arc surface 23a is in contact with the upper roller 19. It should be noted that another short side which forms a pair with the short side constituting the circular arc surface 23a may not constitute a circular arc surface such as shown in FIG. 7A.

In this embodiment, a weight 24 is provided closer to one of two longitudinally opposite ends of the roller holding member 23 to cause the roller holding member 23 to naturally hang down when no external force acts thereon. Specifically, the weight 24 is provided in a portion of the roller holding member 23 which is located on the opposite side of the position at which the roller holding member 23 is fitted to the shaft 18a, from the side on which the circular arc surface 23a is formed.

Figure 8A:
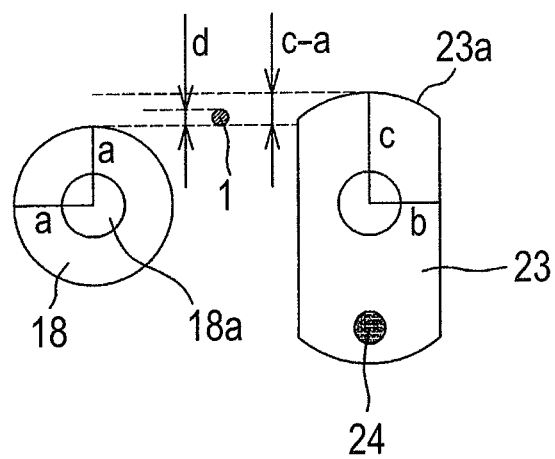
FIGS. 8A and 8B are views for explaining the dimensional relationship between a lower roller and a roller holding member of the scrap collector.
Figure 8B:
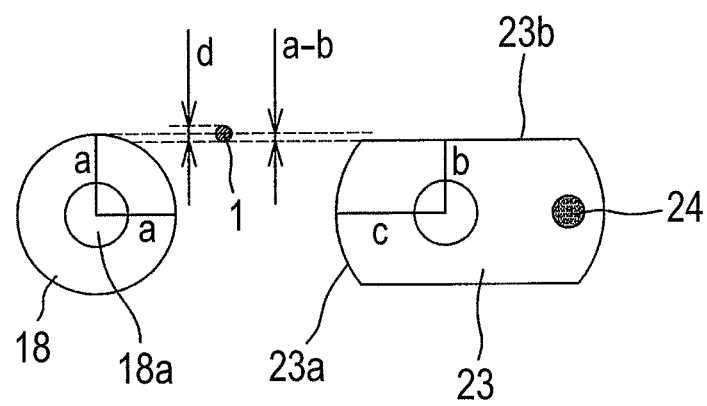

FIGS. 8A and 8B are views for explaining the dimensional relationship between the lower roller 18 and the roller holding member 23 of the scrap collector 20. As shown in these drawings, the radius of the lower roller 18 is denoted by a, half of a width of the roller holding member 23 having an approximately rectangular shape is denoted by b, the radius of the circular arc surface 23a is denoted by c, and the diameter of the optical fiber is denoted by d. Then, the values a, b, c, and d satisfy the following formula:

$$c-a > d > a-b.$$

In the optical fiber cutter 11 having the scrap collector 20 attached thereto, when the optical fiber 1 is cut, the optical fiber holding portion 2 grips the coated optical fiber 1A in advance.

On the other hand, as described previously, the roller holding member 23 is loosely fitted to the shaft 18a of the lower roller 18. Accordingly, in the scrap collector 20, in the case where the lid 14 is open, no external force acts on the roller holding member 23, and the roller holding member 23 is in the natural downward hanging state. Specifically, the side of the roller holding member 23 on which the weight 24 is present is located lower by its own weight, and the circular arc surface 23a formed on the opposite side becomes an upper end face.

In this phase, when the lid 14 is closed, the upper roller 19 comes in contact with the circular arc surface 23a of the roller holding member 23 as shown in FIGS. 4A, 4B, 5 and 7A. In this state, c−a>d (see FIG. 8A). Thus, a clearance h (=c−a) larger than the diameter d of the optical fiber 1 is left between the upper roller 19 and the lower roller 18, and the lower roller 18 and the upper roller 19 are kept from holding the optical fiber 1 therebetween.

Subsequently, the clamps 3 and 4 grip the optical fiber 1 on both sides of a position to be cut. After that, the optical fiber pushing member 6 pushes down the optical fiber 1 to impose tension on the optical fiber 1 as well as pressing the optical fiber 1 against the cutting blade 5, thus cutting the optical fiber 1. In this case, the upper clamps 3B and 4B and the optical fiber pushing member 6 move down at the same time. Specifically, the upper clamps 3B and 4B grip the optical fiber 1, and then the optical fiber pushing member 6 pushes down the optical fiber 1 after a slight delay.

Figure 1A:
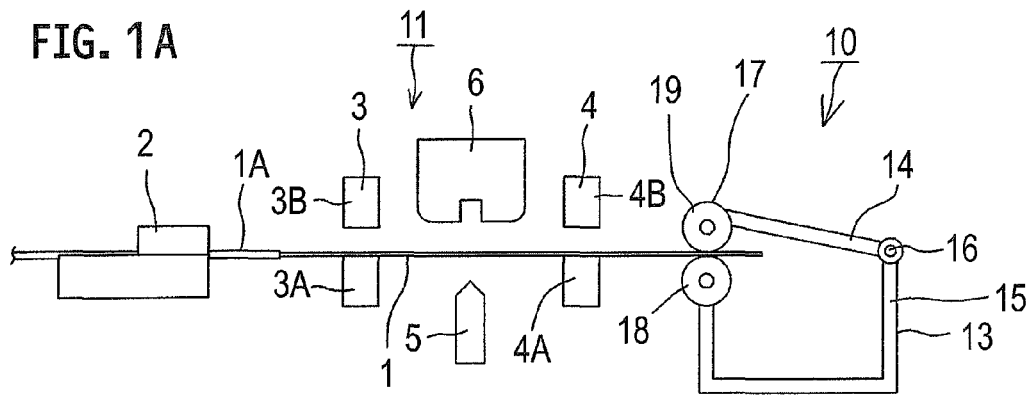
FIGS. 1A to 1C are views schematically showing a conventional scrap collector and a conventional optical fiber cutter having the conventional scrap collector attached thereto.
Figure 1B:
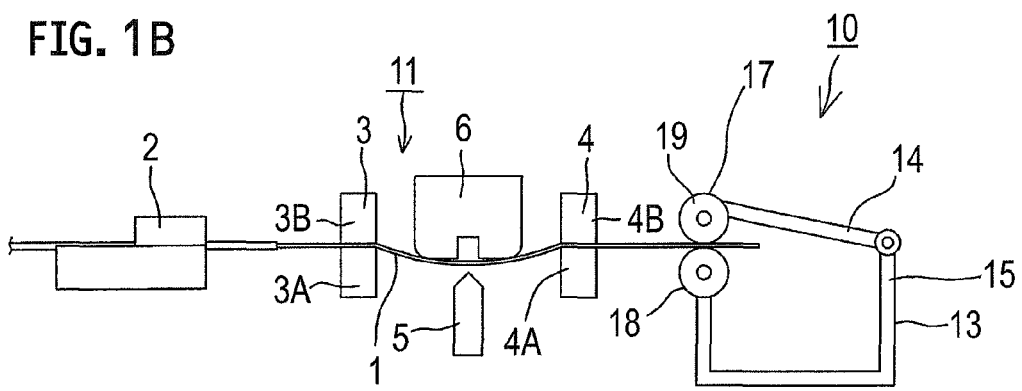
Figure 1C:
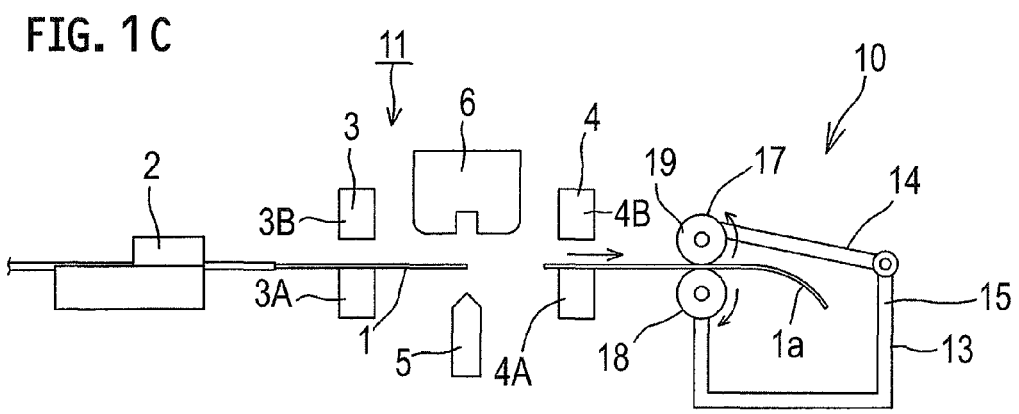
Figure 2A:
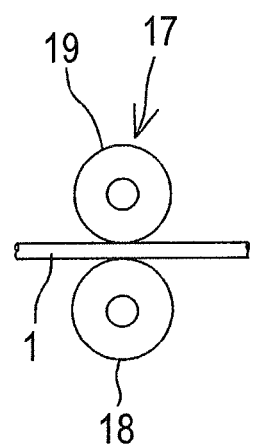
FIGS. 2A and 2B are views for explaining a problem (occurrence of twisting) which arises in the scrap collector of FIG. 1A when the upper and lower rollers hold an optical fiber therebetween.
Figure 2B:
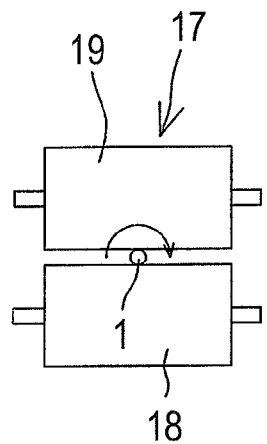
Figure 3:
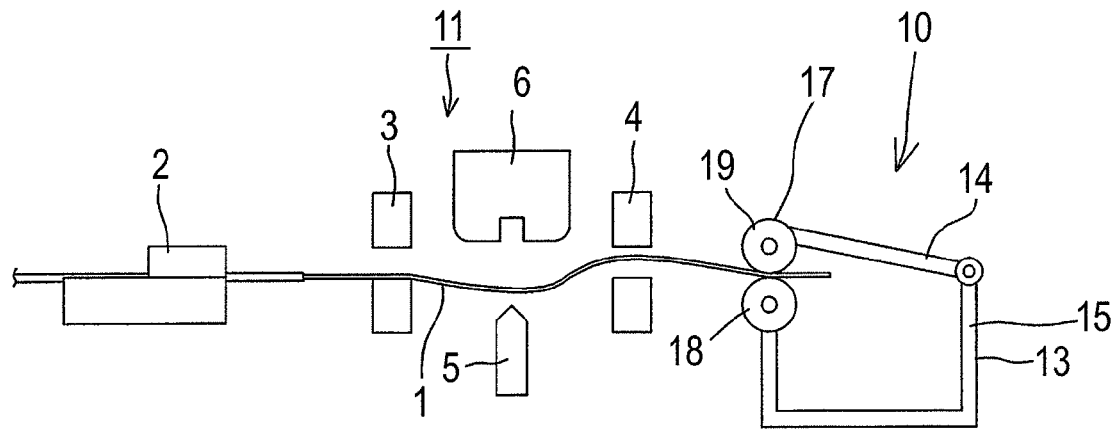
FIG. 3 is a view for explaining another problem (occurrence of bending) which arises in the scrap collector of FIG. 1A when the upper and lower rollers hold an optical fiber therebetween.

As described above, before the clamps 3 and 4 grip the optical fiber 1, the lower roller 18 and the upper roller 19 of the scrap collector 20 do not hold the optical fiber 1 therebetween. Accordingly, the conventional problems (i.e., the occurrence of twisting or looseness (slack) in an optical fiber) described with reference to FIGS. 2 and 3 do not occur. Specifically, the optical fiber 1 can be cut in a state in which there is no twisting or bending in the optical fiber 1, and therefore an improper cut angle can be prevented.

Moreover, in the cutting operation, the lower roller 18 and the upper roller 19 are present below and above the optical fiber 1, respectively. This can prevent an optical fiber scrap 1a from bouncing at random, and can prevent the optical fiber scrap 1a from failing to be collected into the scrap receptacle 15.

Figure 7B:
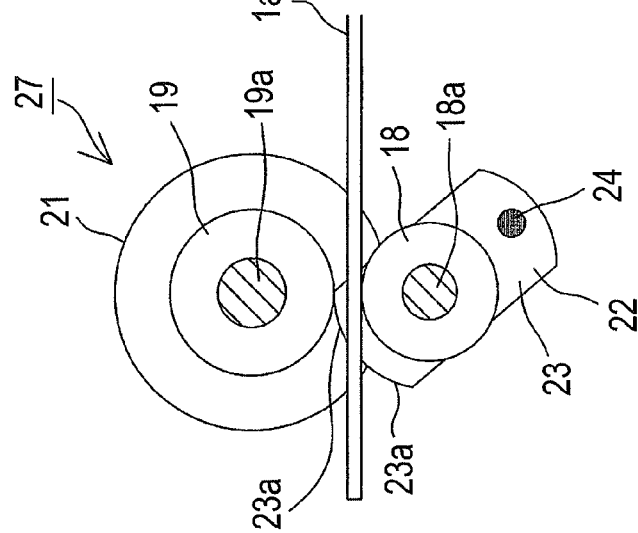
FIG. 7B is a cross-sectional view showing a phase between the states shown in FIGS. 7A and 7C.
Figure 7C:
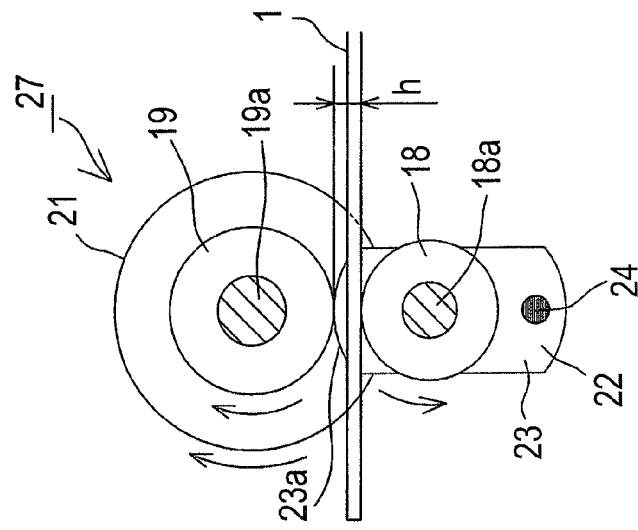
FIG. 7C is a cross-sectional view (showing a phase in which an optical fiber scrap is collected with a feeding mechanism of the scrap collector after the cutting of the optical fiber) taken along line D-D of FIG. 6.

The optical fiber scrap 1a is collected into the scrap receptacle 15 by the following operation. First, the knob 21 is turned as indicated by an arrow in FIG. 7A to rotate the upper roller 19 clockwise. When the upper roller 19 starts rotating clockwise, the roller holding member 23 having the circular arc surface 23a in contact with the upper roller 19 starts rotating counterclockwise (see FIG. 7B). Further, the upper roller 19 comes in contact with an end of the circular arc surface 23a (see FIG. 7B), and then comes in contact with a side surface 23b of the roller holding member 23 as shown in FIG. 7C.

In a state in which the upper roller 19 is in contact with the side surface 23b, d>a−b (see FIG. 8B). In other words, the clearance between the lower roller 18 and the upper roller 19 is at least smaller than the diameter d of the optical fiber 1. Accordingly, the optical fiber 1 is held by and between the lower roller 18 and the upper roller 19. With this state maintained, when the knob 21 is turned to rotate the upper roller 19, the optical fiber scrap 1a is advanced into the scrap receptacle 15 by the rotation of the lower roller 18 and the upper roller 19.

As described above, the roller holding mechanism 22 is configured by loosely fitting the roller holding member 23 having a simple shape to the shaft 18a of the lower roller 18. In this configuration, in a state in which the lower roller 18 and the upper roller 19 are not actuated, a clearance h enough to keep the lower roller 18 and the upper roller 19 from holding the optical fiber 1 therebetween is formed. Further, the operation of lowering the upper roller 19 and gripping the optical fiber can be performed by rotating the upper roller 19 using the knob 21.

Moreover, a manipulation for performing such an operation is merely turning the knob 21 after the optical fiber is gripped by the clamps and cut. Thus, workability is very good.

FIG. 9 shows the appearance of the scrap collector 20 and the optical fiber cutter 11 of this embodiment. As shown in this drawing, the optical fiber cutter 11 includes the cutter main body 31 and the cutting lever 32 attached to the cutter main body 31 to be rotatable about a pivot 33. The cutting lever 32 can be kept open by a support pin 36 for facilitating work.

In the cutter main body 31, a blade stage 29 having the cutting blade 5 attached thereto is provided, and the lower clamps 3A and 4A are provided on two opposite sides of the blade stage 29, respectively. Reference numeral 34 denotes a holder installation portion on which the optical fiber holder (optical fiber holding portion 2) gripping a coated portion of the optical fiber is installed.

In the cutting lever 32, the upper clamps 3B and 4B are provided which correspond to the lower clamps 3A and 4A, respectively. Also, in the cutting lever 32, the optical fiber pushing member 6 is provided between the upper clamps 3B and 4B. The upper clamps 3B and 4B are biased downward by springs, which are not shown in the drawing. The upper clamps 3B and 4B can be elastically displaced when moving down to grip the optical fiber with the lower clamps 3A and 4A.

With regard to the scrap collector 20, FIG. 9 shows the scrap receptacle main body 13 and the lid 14 of the scrap receptacle 15, and the upper roller 19 and the knob 21 of the optical fiber feeding mechanism 27.

The optical fiber cutter 11 and the scrap collector 20 operate as described above with reference to FIGS. 4 to 8.

It should be noted that in the above-described embodiment, the weight 24 is provided to cause the roller holding member 23 to be in the natural downward hanging state when no external force acts thereon. However, instead of providing the weight 24, as shown in a roller holding member 23' in FIGS. 10A and 10B having the same function as the roller holding member 23, a portion of the roller holding member 23' which is located on the opposite side of the shaft 18a of the lower roller 18 from the side on which a circular arc surface 23a' (corresponding to the circular arc surface 23a) is formed may be elongated in the direction away from the shaft 18a. Specifically, the position in the roller holding member 23' at which the roller holding member 23' is loosely fitted to the shaft 18a of the lower roller 18 is off-center toward one of two longitudinally opposite ends of the roller holding member 23' (e.g., positioned on the side on which the circular arc surface 23a' is present). In other words, a portion of the roller holding member 23' which is located on the opposite side of the shaft 18a from the side on which the circular arc surface 23a' is formed, is formed such that turning moment (torque) about the shaft 18a is not less than turning moment (torque) for the case where the weight 24 is provided to obtain a natural downward hanging state. It should be noted that reference numeral 22' denotes a roller holding mechanism, which corresponds to the roller holding mechanism 22. Reference numeral 27' denotes an optical fiber feeding mechanism, which corresponds to the optical fiber feeding mechanism 27.

As shown in FIG. 10A, when no external force acts on the roller holding member 23', the roller holding member 23' is maintained in a natural downward hanging state, and a clearance is formed between the lower roller 18 and the upper roller 19. In this state, by rotating the upper roller 19 using the knob 21, the lower roller 18 and the upper roller 19 hold the optical fiber 1 therebetween and rotate as shown in FIG. 10B. Thus, the optical fiber scrap is advanced into the scrap receptacle.

Figure 11A:
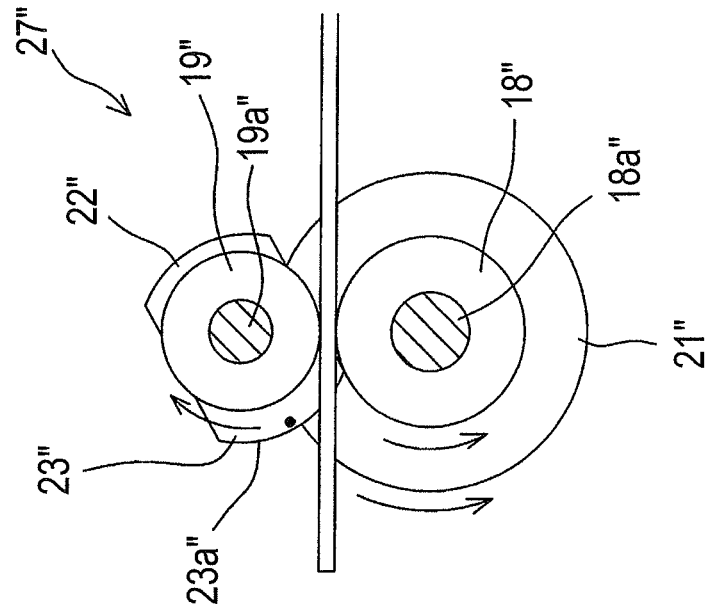
FIGS. 11A and 11B are views showing another embodiment of the roller holding mechanism.
Figure 11B:
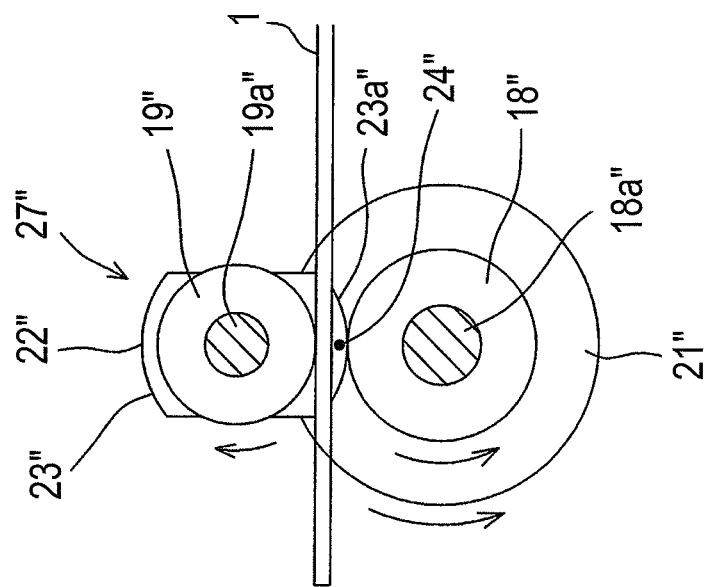

It should be noted that as shown in FIGS. 11A and 11B, a roller holding member 23" having the same function as the roller holding member 23 may also be loosely fitted to a shaft 19a" of an upper roller 19" having the same function as the upper roller 19. In this case, to rotate a lower roller 18" having the same function as the lower roller 18, a knob 21" is attached to a shaft 18a" of the lower roller 18". Moreover, to exert the same effect as the weight 24, a weight 24" is provided in a portion of the roller holding member 23" which is located on the same side of the shaft 19a" as the circular arc surface 23a. It should be noted that reference numeral 22" denotes a roller holding mechanism, which corresponds to the roller holding mechanism 22. Reference numeral 27" denotes an optical fiber feeding mechanism, which corresponds to the optical fiber feeding mechanism 27.

In this configuration, also, a clearance enough to keep the lower roller 18" and the upper roller 19" from holding the optical fiber 1 therebetween is formed in a state (or initial state) in which the lower roller 18" and the upper roller 19" are not actuated, and the upper roller 19" can be lowered to cause the optical fiber 1 to be held by and between the lower roller 18" and the upper roller 19" by rotating the lower roller 18" using the knob 21".

What is claimed is:

1. A scrap collector for an optical fiber cutter for collecting an optical fiber scrap cut out to be discarded, the scrap collector comprising:
   a scrap receptacle attached to a cutter main body; and
   an optical fiber feeding mechanism provided in the scrap receptacle,
   the optical fiber feeding mechanism comprising:
      a lower roller for receiving a tip portion of an optical fiber, the tip portion being cut out to be discarded;
      an upper roller capable of being raised away from and lowered toward the lower roller, the upper roller causing the tip portion of the optical fiber to be held by and between the upper roller and the lower roller and advancing the tip portion into the scrap receptacle; and a roller holding mechanism for forming, in a state in which the upper roller and the lower roller are not actuated, a clearance enough to keep the upper roller and the lower roller from holding the optical fiber therebetween, and lowering the upper roller in accordance with rotation of any one of the upper roller and the lower roller to cause the upper roller and the lower roller to hold the optical fiber therebetween; wherein the roller holding mechanism comprises a roller holding member loosely fitted to a shaft of any one of the upper roller and the lower roller, the roller holding member is formed in an approximately rectangular shape having two short sides and two long sides corresponding to two pairs of opposite sides, the roller holding member comprises a circular arc surface with a center thereof at the shaft of the one roller, the circular arc surface being formed by at least one of the two short sides, the roller holding member is configured to naturally hang down with a longitudinal direction thereof vertically oriented when no external force acts on the roller holding member, and the circular arc surface of the roller holding member is in contact with the other of the upper roller and the lower roller when the roller holding member naturally hangs down.

2. The scrap collector according to claim 1, wherein the following formula is satisfied:

$$c-a>d>a-b$$

where a denotes a radius of the any one of the upper roller and the lower roller, b denotes half of a width of the roller holding member, c denotes a radius of the circular arc surface, and d denotes a diameter of the optical fiber.

3. The scrap collector according to claim 1, wherein a weight is provided closer to one of two longitudinally opposite ends of the roller holding member to cause the roller holding member to naturally hang down when no external force acts thereon.

4. The scrap collector according to claim 2, wherein a weight is provided closer to one of two longitudinally opposite ends of the roller holding member to cause the roller holding member to naturally hang down when no external force acts thereon.

5. The scrap collector according to claim 1, wherein a position in the roller holding member at which the shaft of the one roller is loosely fitted thereto is off-center toward one of two longitudinally opposite ends of the roller holding member, to cause the roller holding member to naturally hang down when no external force acts thereon.

6. The scrap collector according to claim 2, wherein a position in the roller holding member at which the shaft of the one roller is loosely fitted thereto is off-center toward one of two longitudinally opposite ends of the roller holding member, to cause the roller holding member to naturally hang down when no external force acts thereon.

7. The scrap collector according to claim 1, wherein the scrap receptacle comprises a scrap receptacle main body detachably attached to the cutter main body and a lid attached to the scrap receptacle main body with a hinge in an openable and closable manner, the lower roller is attached to the scrap receptacle main body, and the upper roller is attached to the lid.

* * * * *